(12) United States Patent
Tai

(10) Patent No.: US 6,804,432 B2
(45) Date of Patent: Oct. 12, 2004

(54) OPTICAL ADD-DROP MULTIPLEXER

(75) Inventor: Shu-Lin Tai, San Jose, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/272,781

(22) Filed: Oct. 16, 2002

(65) Prior Publication Data

US 2004/0076369 A1 Apr. 22, 2004

(51) Int. Cl.[7] .............................................. G02B 6/293
(52) U.S. Cl. .............................. 385/24; 385/33; 385/39; 385/47
(58) Field of Search ............................... 385/24, 33–35, 385/43–48, 39

(56) References Cited

U.S. PATENT DOCUMENTS

| | | | |
|---|---|---|---|
| 5,812,307 A | * | 9/1998 | Naganuma ............... 359/341.1 |
| 6,249,625 B1 | * | 6/2001 | Pan ............................. 385/43 |
| 6,488,414 B1 | * | 12/2002 | Dawes et al. ................ 385/79 |
| 6,556,743 B2 | * | 4/2003 | Kim et al. ................... 385/24 |

FOREIGN PATENT DOCUMENTS

| | | | | |
|---|---|---|---|---|
| DE | 3229570 A1 | * | 2/1984 | .......... G02B/5/176 |
| JP | 60010209 A | * | 1/1985 | ............ G02B/6/28 |

* cited by examiner

*Primary Examiner*—Hemang Sanghavi
*Assistant Examiner*—Scott Alan Knauss
(74) *Attorney, Agent, or Firm*—Wei Te Chung

(57) ABSTRACT

An optical add-drop multiplexer (OADM) apparatus (10) includes an input/output channel (100), a drop channel (200), an add channel (300) and an optical filter (500). Light signals having a specific wavelength are transmitted from an input fiber (101) and pass through the input/output channel, the specific wavelength of the light signals passes through the filter and the drop channel and goes into a drop fiber (201). Another light signal having the specific wavelength is transmitted from an add fiber (302), passes through the add channel and the filter, and combines with the reflected wavelengths of the light signals, and the combined wavelengths pass through the input/output channel and go into an output fiber (102).

15 Claims, 4 Drawing Sheets

OPTICAL ADD-DROP MULTIPLEXER

BACKGROUND OF THE INVENTION

1. Field of the Invention

The present invention generally relates to an optical add-drop multiplexer (referred to as an OADM hereinafter) installed in an optical wavelength-division multiplexed (WDM) communications network for extracting a specific wavelength from an optical WDM signal and simultaneously complementing the optical WDM signal with an optical signal component having a wavelength identical to that of the, extracted wavelength.

2. Description of the Related Art

Optical WDM communications networks are normally used as bulk-sized communications networks. In such networks, a plurality of light signals are multiplexed and transmitted along a single optical fiber line. More specifically, since different optical wavelengths of their respective light signals are assigned to different receivers in the network, multiple-to-multiple communications arrangements are made possible.

Referring to FIG. 4, U.S. Pat. No. 5,822,095 discloses an OADM apparatus for use in a WDM network. The wavelength components $\lambda_1$ to $\lambda_n$ of an input n-wavelength signal are received through an input optical fiber 1' and pass through a circulator 3' to an optical bandpass filter 4', which allows a specific wavelength $\lambda_1$ to pass but rejects the other wavelengths $\lambda_2$ to $\lambda_n$. While the rejected wavelengths $\lambda_2$ to $\lambda_n$ are returned via the optical fiber 5', the specific wavelength $\lambda_1$ transmits through another optical fiber 9' and another circulator 8', and then is dropped via an output optical fiber 6'. Meanwhile, a second signal component having wavelength $\lambda_1$ is introduced through another input optical fiber 7' and transmits through the optical circulator 8', through the optical fiber 9' and through the optical bandpass filter 4', whereupon it enters the optical fiber 5' and is added to the rejected wavelengths $\lambda_2$ to $\lambda_n$. A resultant sum signal of the full set of wavelengths $\lambda_1$ to $\lambda_n$ is passed through the optical circulator 3' and is transmitted from the OADM apparatus via an output optical fiber 2'.

Referring to FIG. 5, U.S. Pat. No. 5,926,300 also discloses an OADM apparatus, which comprises a first and a second optical circulators 1, 2, a first and a second wavelength reflecting fiber gratings 3, 4 and an isolator 5 connected between the first and the second wavelength reflecting fiber gratings 3, 4. The isolator 5 is provided for preventing a light signal from being reflected back and being amplified between the first and the second wavelength reflecting fiber gratings 3, 4.

However, the above-mentioned OADM apparatus comprise optical circulators, fiber gratings or an isolator and thus include many complicated optical components, which can result in the apparatus being complex to construct and high in cost.

SUMMARY OF THE INVENTION

Therefore, an object of the present invention is to provide an improved OADM apparatus which is easy to construct and low in cost.

An OADM apparatus in accordance with the present invention includes an input/output channel, a drop channel, an add channel and a filter. Light signals having a plurality of wavelengths pass through the input/output channel, one specific wavelength of the light signals passes through the filter and the drop channel and goes into a drop fiber, all other wavelengths are reflected back. Another light signal having the specific wavelength passes through the add channel and the filter and combines with the reflected wavelengths of the light signals, and the combined wavelengths pass through the input/output channel and go into the output fiber.

Other objects, advantages and novel features of the present invention will be drawn from the following detailed description of a preferred embodiment of the present invention with attached drawings, in which:

DETAILED DESCRIPTION OF THE INVENTION

Figure 1:
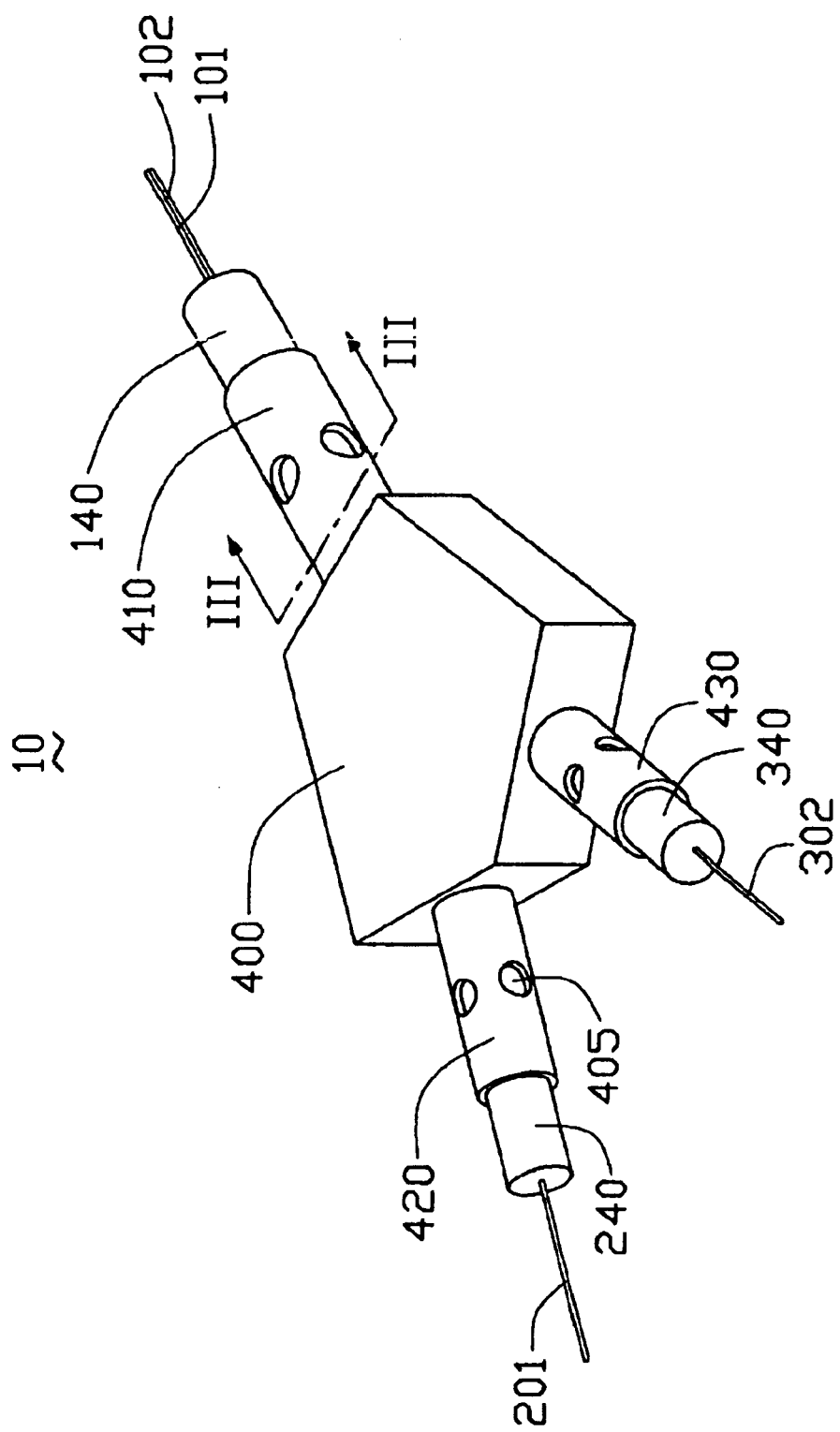
FIG. 1 is a perspective view of an OADM apparatus according to the present invention.
Figure 2:
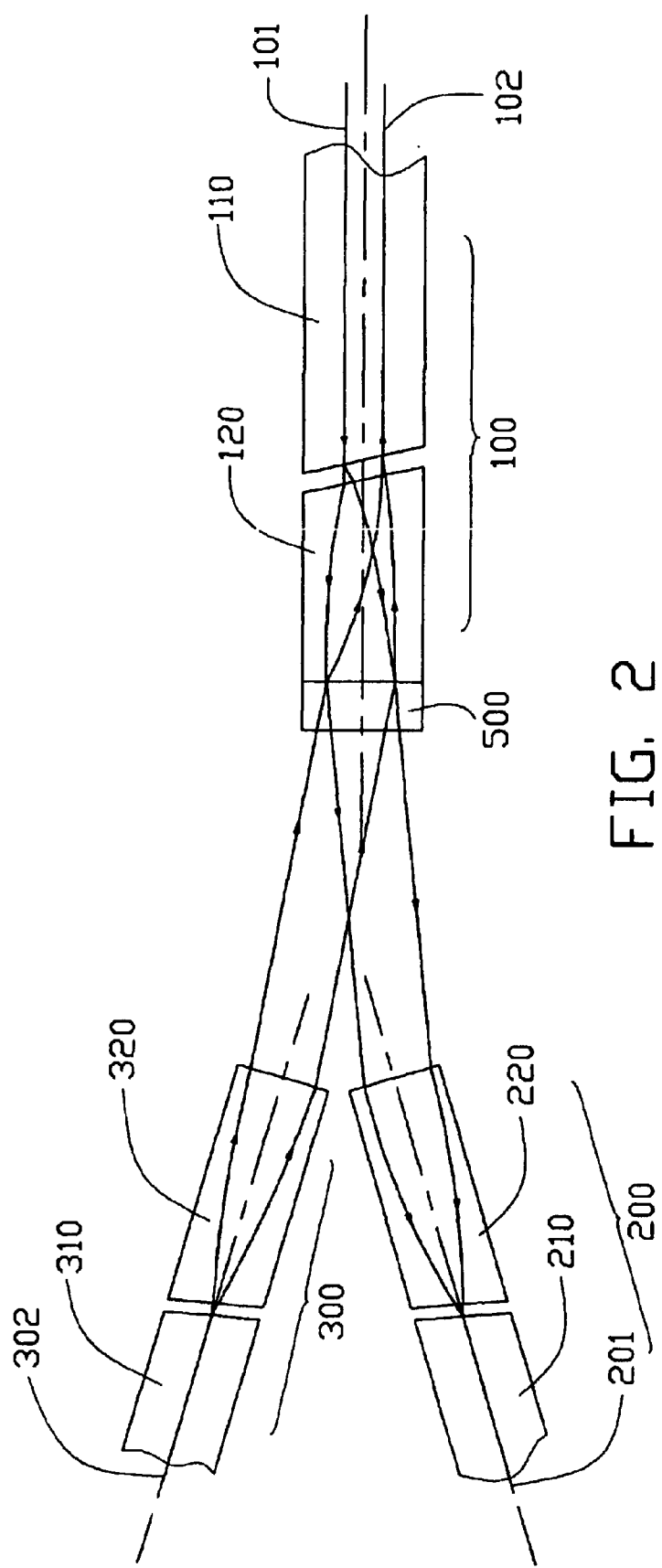
FIG. 2 is a light path schematic diagram of the OADM apparatus of FIG. 1.

As shown in FIGS. 1 and 2, an OADM apparatus 10 according to the present invention includes an input/output channel 100 for inputting a WDM light signal having wavelengths $\lambda_1$ to $\lambda_n$ and outputting an altered WDM light signal having wavelengths $\lambda_1$ to $\lambda_n$, a drop channel 200 for dropping and outputting a specific wavelength $\lambda_1$, an add channel 300 for adding and inputting a specific wavelength $\lambda_1$, and a container 400 for receiving and protecting the input/output channel 100, the drop channel 200 and the add channel 300.

The input/output channel 100 includes a first dual-fiber ferrule 110 and a first collimating lens 120. An input fiber 101 and an output fiber 102 are symmetrically and closely arranged along the axis of the first fiber ferrule 110. The input fiber 101 is provided for receiving an optical WDM signal having wavelengths $\lambda_1$ to $\lambda_n$ into the OADM apparatus 10, and the output fiber 102 is provided for transmitting an altered optical WDM signal of wavelengths $\lambda_1$ to $\lambda_n$ out of the OADM apparatus 10. The first collimating lens 120 is positioned near the first fiber ferrule 110. The optical axis of the first collimating lens 120 is coincident with the axis of the first dual-fiber ferrule 110.

A filter 500 is interposed between the input/output channel 100 and the drop channel 200 and add channel 300. The filter 500 is attached to an end face of the first collimating lens 120 using epoxy resins. The filter 500 comprises a multi-layer dielectric thin film which allows the center wavelength $\lambda_1$ to pass through while reflecting the other wavelengths $\lambda_2$ to $\lambda_n$.

The drop channel 200 includes a second fiber ferrule 210 and a second collimating lens 220. The second collimating lens 220 is positioned near the filter 500 and has an optical axis which intersects but deviates from that of the first collimating lens 120 by a certain angle. The certain angle is such that the specific wavelength $\lambda_1$ which passes through the filter 500 is completely directed into the second collimating lens 220. The second fiber ferrule 210 is positioned near the second collimating lens 210. A drop fiber 201 is fixed into the second fiber ferrule 210 and aligns with the optical axis of the second collimating lens 220 for extracting and dropping the specific wavelength $\lambda_1$.

The add channel 300 includes a third fiber ferrule 310 and a third collimating lens 320. An add fiber 302 is fixed in the third fiber ferrule 310 for inputting and adding the specific wavelength $\lambda_1$. The third collimating lens 320 is near the filter 500 and has an optical axis that aligns with the add fiber 302 and intersects but deviates a certain angle from that of first collimating lens 120 so that the added specific wavelength $\lambda_1$ is completely directed into the first collimating lens 120.

Referring to FIG 2, the light paths of the OADM apparatus 10 are shown. WDM light signals having wavelengths $\lambda_1$ to $\lambda_n$ transmitted from the input fiber 101 are deviated a certain angle (normally 1.88 degrees) inside the first collimating lens 120 and are then directed into the filter 500. Since the wavelengths $\lambda_2$ to $\lambda_n$ of the light signals are different from the center wavelength $\lambda_1$ of the filter 500, they are reflected by the filter 500 and are returned through the first collimating lens 120 to the output fiber 102. Light signals having the wavelengths $\lambda_1$, equal to the center wavelength $\lambda_1$ of the filter 500, pass through the filter 500, are focused by the second collimating lens 220, and couple into the drop fiber 201. Another add light signal having the wavelength $\lambda_1$ is transmitted through the add fiber 302 and is deviated a corresponding angle after passing through the third collimating lens 320, and then passes through the filter 500 and mixes with the reflected wavelengths $\lambda_2$ to $\lambda_n$ of the input light signals, thereby forming new WDM light signals that transmit into the output fiber 102.

Because the light paths, are reversible, in practice, the drop channel 200 can be used to both receive the specific wavelength $\lambda_1$ from the input fiber 101 and to add the specific wavelength $\lambda_1$ to the output fiber 102. Thus the drop channel 200 can be combined with the add channel 300 with the help of other optical devices, such as an optical switch.

Referring to FIG 1, the container 400 defines a passageway (not shown) in the shape of the letter "Y" in an interior thereof. Three ports communicate with the passageway, each port mounting a corresponding holding tube 410, 420 and 430. The positional arrangement of the passageway accords with the transmission paths of the light in the OADM apparatus 10. In assembly, three metal sleeves 140, 240, and 340, into which the input/output channel 100, the drop channel 200 and the add channel 300 are respectively assembled, are directly inserted into the corresponding holding tubes 410, 420 and 430. Each holding tube defines a plurality of through holes 405. Solder material is injected into the through holes 405 to fix the assembled metal sleeves in the holding tubes.

Figure 3:
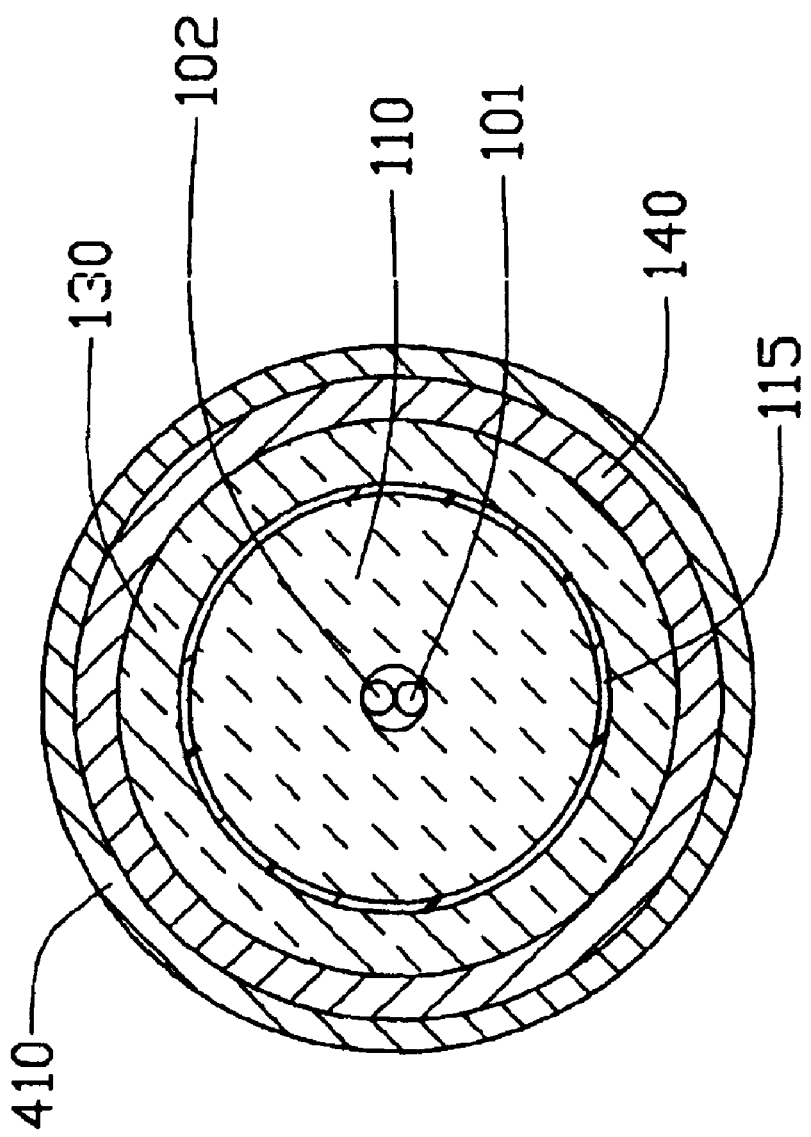
FIG. 3 is a cross-section view of an assembled input/output channel in a holding tube taken along line III—III of FIG. 1.
Figure 4:
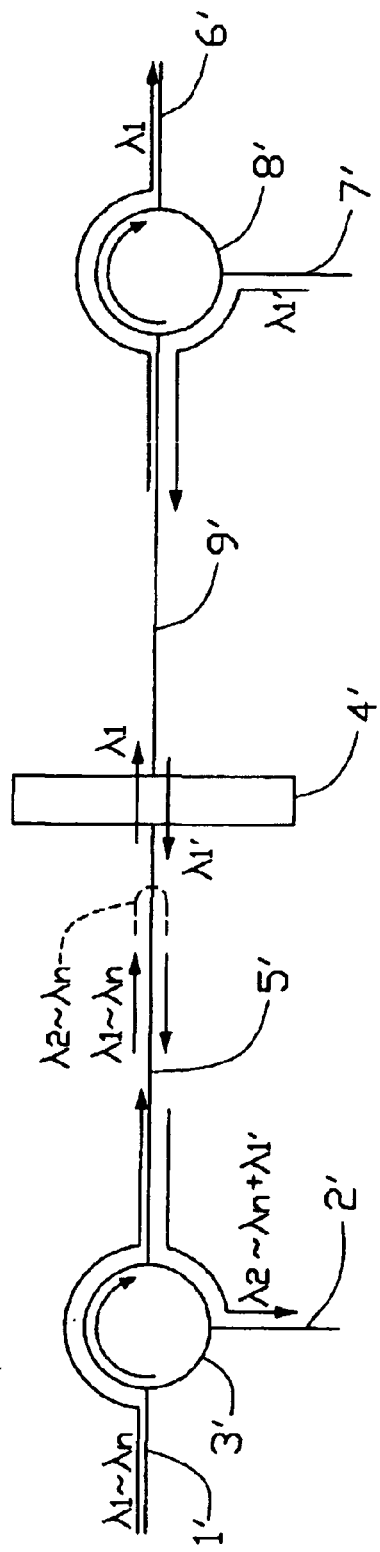
FIG. 4 is an OADM apparatus of the prior art.
Figure 5:
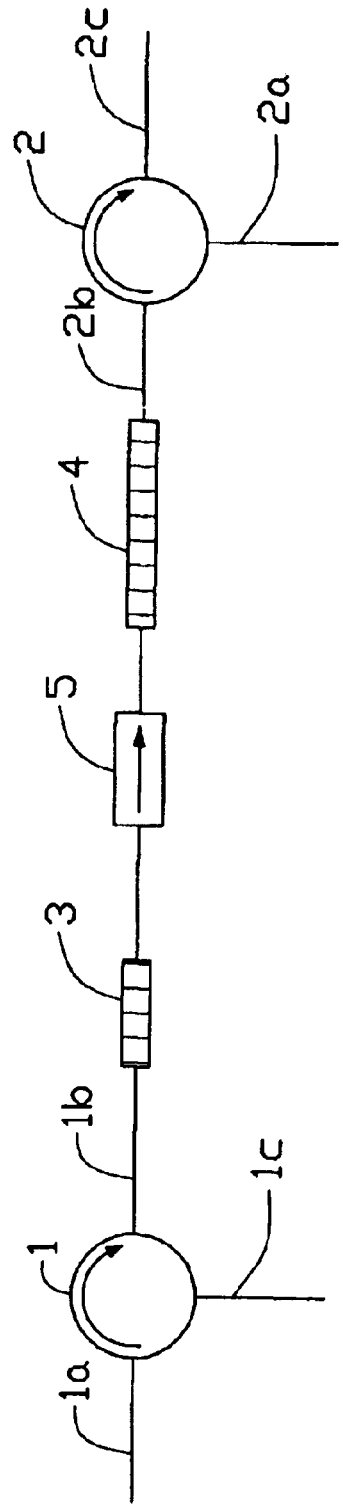
FIG. 5 is another OADM apparatus of the prior art.

FIG. 3 shows a cross-sectional view of the assembled input/output channel 100 in the holding tube 410. The first fiber ferrule 110, the first collimating lens 120, and the filter 500 are received together in a quartz sleeve 130 and are fixed therein with epoxy resin 115. The metal sleeve 140 further surrounds the quartz sleeve 130 to protect the quartz sleeve 130.

In the same way, the second fiber ferrule 210 and the second collimating lens 220 are received into a quartz sleeve (not shown) and surrounded by the metal sleeve 240, and the third fiber ferrule 310 and the third collimating lens 320 are received into a quartz sleeve (not shown) and are surrounded by the metal sleeve 340.

In another embodiment (not shown), the input/output channel 100, the drop channel 200 and the add channel 300 also can be arranged on the same side of the filter 500. A reflecting element is arranged on the opposite side of the filter 500. In this embodiment, the specific wavelengths $\lambda_1$ of the light signals pass through the filter 500 and are directed to a reflecting element, and then are reflected back through the drop channel 200, and another light signal having the specific wavelength $\lambda_1$ passes through the add channel 300 and is then directed to the reflecting element and is reflected back to the filter 500 and goes the input/output channel 100.

The OADM apparatus 10 according to the present invention has fewer optical components and a simpler construction than the referenced prior art. Therefore, the needed production will be reduced and the optical performance will be improved.

It should be understood that various changes and modifications to the presently preferred embodiment described herein will be apparent to those skilled in the art. Such changes and modifications may be made without departing from the spirit and scope of the present invention and without diminishing the present invention's advantages. Thus, it is intended that such changes and modifications be covered by the appended claims.

What is claimed is:

1. An optical add-drop multiplexer apparatus for connecting with an input fiber, an output fiber, a drop fiber and an add fiber, comprising:

an input/output channel connecting to the input and output fibers and having a first collimating lens coupling with the input and output fibers;

an optical filter coupling with the first collimating lens;

a drop channel having a second collimating lens coupling with the optical filter and the drop fiber; and an add channel having a third collimating lens coupling with the optical filter and the add fiber;

wherein light signals having a plurality of wavelengths are transmitted from the input fiber and pass through the first collimating lens, the filter passes one predetermined wavelength of light signals and reflects all other wavelengths back, the predetermined wavelength passes through the second collimating lens and goes into the drop fiber, another light signal having the predetermined wavelength is transmitted from the add fiber and passes through the third collimating lens and the filter and combines with the reflected wavelengths of the light signals, and the combined wavelengths pass through the first collimating lens and couple into the output fiber.

2. The optical add-drop multiplexer apparatus according to claim 1, wherein a first dual-fiber ferrule is adjacent to and aligned with the first collimating lens for receiving the input and output fibers therein.

3. The optical add-drop multiplexer apparatus according to claim 1, wherein a second fiber ferrule is adjacent to and aligned with the second collimating lens for receiving the drop fiber therein.

4. The optical add-drop multiplexer apparatus according to claim 1, wherein a third fiber ferrule is adjacent to and aligned with the third collimating lens for receiving the add fiber therein.

5. The optical add-drop multiplexer apparatus according to claim 2, wherein the input and output fibers are closely received in the first dual-fiber ferrule and are symmetrically arranged along the axis of the first dual-fiber ferrule.

6. The optical add-drop multiplexer apparatus according to claim 1, wherein the filter attaches to an end face of the first collimating lens.

7. The optical add-drop multiplexer apparatus according to claim 1, wherein an optical axis of the second collimating lens intersects but deviates a certain angle from that of the first collimating lens.

8. The optical add-drop multiplexer apparatus according to claim 1, wherein an optical axis of the third collimating lens intersects but deviates a certain angle from that of the first collimating lens.

9. The optical add-drop multiplexer apparatus according to claim 1, wherein the filter is interposed between the first collimating lens and the second and third collimating lenses.

10. The optical add-drop multiplexer apparatus according to claim 1, wherein the input/output channel, the drop channel and the add channel are arranged on the same side of the filter.

11. The optical add-drop multiplexer apparatus according to claim 1, further comprising a container having a passageway shaped to accommodate the light paths among the input fiber, the add fiber, the drop fiber and the output fiber.

12. The optical add-drop multiplexer apparatus according to claim 11, wherein the passageway has three ports.

13. The optical add-drop multiplexer apparatus according to claim 12, wherein the first, second and third collimating lenses respectively align with the three ports of the passageway.

14. An optical add-drop multiplexer apparatus comprising:
   a filter;
   an input/output channel including a first light diverging/converging device located on one side of said filter; input and output fibers coupled to said input/output channel;
   a drop channel with a second light diverging/converging device located around the filter and coupling with a drop fiber and the filter;
   an add channel with a third light diverging/converging device located around the filter and coupling with an add fiber and the filter; wherein
   light paths in said input/output channel, the drop channel and the add channel share a same diverging region on the filter, and wherein a specific wavelength of a light signal from the input fiber passing the filter and directs to the drop channel, and a same specific wavelength of another light from the add channel passing the filter and directs to the input/output channel and joins other wavelengths of said light signal which are reflected by said filter and enter the output fiber; wherein
   all said first, second and third light diverging/converging devices are arranged in a triangular manner.

15. The apparatus according to claim 14, wherein all said first, second and third light diverging/converging devices are equipped with corresponding collimating lenses, respectively.

* * * * *